United States Patent
Hu et al.

(10) Patent No.: US 12,223,250 B2
(45) Date of Patent: Feb. 11, 2025

(54) METHOD OF MANUFACTURING INTEGRATED CIRCUIT HAVING THROUGH-SUBSTRATE VIA

(71) Applicant: Taiwan Semiconductor Manufacturing Company, Ltd., Hsinchu (TW)

(72) Inventors: Chih-Chia Hu, Taipei (TW); Ming-Fa Chen, Taichung (TW); Sen-Bor Jan, Tainan (TW); Meng-Wei Chiang, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 26 days.

(21) Appl. No.: 18/350,738

(22) Filed: Jul. 11, 2023

(65) Prior Publication Data

US 2023/0351086 A1    Nov. 2, 2023

Related U.S. Application Data

(63) Continuation of application No. 17/366,021, filed on Jul. 1, 2021, now Pat. No. 11,748,544, which is a
(Continued)

(51) Int. Cl.
*G06F 30/392*    (2020.01)
*G06F 119/06*    (2020.01)
(Continued)

(52) U.S. Cl.
CPC ........ *G06F 30/392* (2020.01); *G06F 2119/06* (2020.01); *H01L 23/481* (2013.01); *H01L 27/0886* (2013.01); *H01L 29/0653* (2013.01)

(58) Field of Classification Search
CPC .. G06F 30/392; G06F 2119/06; H01L 23/481; H01L 27/0886; H01L 29/0653
(Continued)

(56) References Cited

U.S. PATENT DOCUMENTS 6,086,238 A * 7/2000 Mehrotra .............. G06F 30/398
716/115
8,604,619 B2 * 12/2013 Hsieh .................... H01L 23/562
257/E23.101
(Continued)

FOREIGN PATENT DOCUMENTS

EP    3971960 A1 *    3/2022    ......... H01L 21/4857
EP    3971965 A1 *    3/2022    ......... H01L 23/5227
EP    4024449 B1 *    2/2024    ....... H01L 21/76838

*Primary Examiner* — Suresh Memula
(74) *Attorney, Agent, or Firm* — JCIPRNET

(57) ABSTRACT

A method includes generating an integrated circuit (IC) layout design and manufacturing an IC based on the IC layout design. Generating the IC layout design includes generating a pattern of a first shallow trench isolation (STI) region and a pattern of a through substrate via (TSV) region within the first STI region; a pattern of a second STI region surrounding the first STI region, the second STI region includes a first and second layout region, the second layout region being separated from the first STI region by the first layout region, first active regions of a group of dummy devices being defined within the first layout region, and second active regions of a group of active devices being defined within the second layout region; and patterns of first gates of the group of dummy devices in the first layout region, each of the first active regions having substantially identical dimension in a first direction.

20 Claims, 8 Drawing Sheets

Related U.S. Application Data continuation of application No. 16/924,195, filed on Jul. 9, 2020, now Pat. No. 11,080,455.

(51) Int. Cl.
*H01L 23/48* (2006.01)
*H01L 27/088* (2006.01)
*H01L 29/06* (2006.01)

(58) Field of Classification Search
USPC .......................................................... 716/120
See application file for complete search history.

(56) References Cited

U.S. PATENT DOCUMENTS

| | | | | |
|---|---|---|---|---|
| 2012/0036489 | A1* | 2/2012 | Wang | G06F 30/39 716/112 |
| 2013/0049220 | A1* | 2/2013 | Hsieh | H01L 21/76898 257/774 |
| 2015/0205904 | A1* | 7/2015 | Sproch | H01L 29/7845 716/119 |
| 2016/0148863 | A1* | 5/2016 | Chen | H01L 23/522 257/774 |
| 2019/0363079 | A1* | 11/2019 | Thei | H01L 23/481 |
| 2020/0006293 | A1* | 1/2020 | Sankman | H01L 24/16 |
| 2021/0082787 | A1* | 3/2021 | Shen | H01L 25/18 |
| 2023/0386999 | A1* | 11/2023 | Tsai | H01L 25/0657 |
| 2023/0395527 | A1* | 12/2023 | Lee | H01L 28/91 |
| 2024/0071956 | A1* | 2/2024 | Yang | H01L 23/585 |
| 2024/0203977 | A1* | 6/2024 | Cho | H01L 27/0292 |
| 2024/0266340 | A1* | 8/2024 | Chou | H01L 25/0652 |

* cited by examiner

METHOD OF MANUFACTURING INTEGRATED CIRCUIT HAVING THROUGH-SUBSTRATE VIA

CROSS-REFERENCE TO RELATED APPLICATION

This is a continuation application of and claims the priority benefit of U.S. application Ser. No. 17/366,021, filed on Jul. 1, 2021, now allowed. The U.S. application Ser. No. 17/366,021 is a continuation application of and claims the priority benefit of U.S. application Ser. No. 16/924,195, filed on Jul. 9, 2020, now U.S. Pat. No. 11,080,455. The entirety of the above-mentioned patent applications is hereby incorporated by reference herein and made a part of this specification.

BACKGROUND

The semiconductor industry has experienced rapid growth due to continuous improvements in the integration density of various electronic components (e.g. transistors, diodes, resistors, capacitors, etc.) in an integration circuit (IC) device. For the most part, this improvement in integration density has come from repeated reductions in minimum feature size, which allows more components to be integrated into a given area. In addition to reduction in minimum feature size, formation of 3-dimensional IC (3DIC) by using through-substrate vias (TSVs) to facilitate die stacking has also contributed to the increase in integration density. However, the implementation of TSVs to form 3DIC may cause additional stress being distributed on active regions near the TSVs during the fabrication process, thereby affecting the performance of active devices in the active regions. It is important to reduce the effect of the TSVs on neighboring active devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
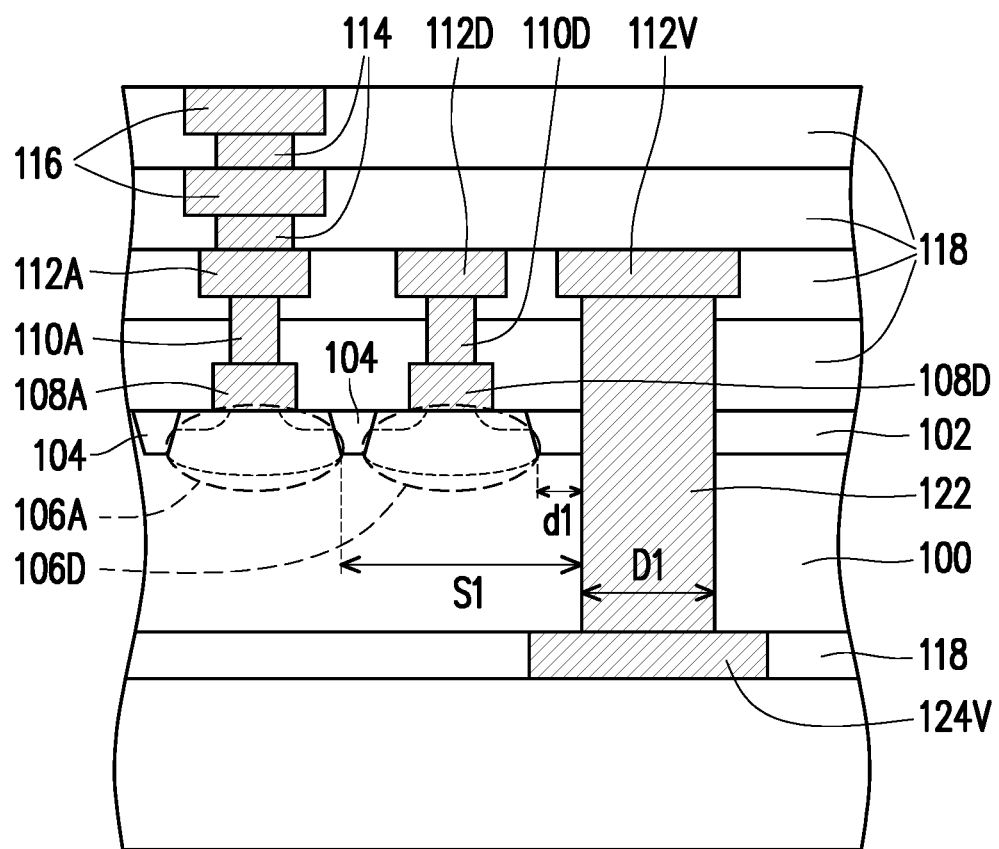
FIG. 1 illustrates a partial cross-sectional view of an integrated circuit (IC) in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a cross-sectional view of an integrated circuit (IC) 10 in accordance with some embodiments. The IC 10 may be a semiconductor wafer (e.g. logic circuit wafer)/a semiconductor chip (e.g. logic circuit chip) including a plurality of semiconductor devices (e.g. transistors, capacitors, diodes, resistors etc.) and a through-substrate via (TSV) formed therein. The IC 10 includes a semiconductor substrate 100 having shallow trench isolation (STI) structures 102 and 104 that define active regions (also referred to as "oxide defined regions") on the semiconductor substrate 100. In other embodiments, the semiconductor substrate 100 is an elementary semiconductor substrate such as germanium; a compound semiconductor substrate including silicon carbon, gallium arsenic, gallium phosphide, indium phosphide, indium arsenide, and/or indium antimonide; an alloy semiconductor substrate including SiGe, GaAsP, AlInAs, AlGaAs, GaInAs, GaInP, and/or GaInAsP; or combinations thereof. Metal layers may be formed over the semiconductor substrate 100 to interconnect the semiconductor devices and TSVs and allow signals to be exchanged. A more detailed description of the IC 10 will be provided below.

Referring to FIG. 1, the STI structures 102 and STI structures 104 are formed in the substrate to define an active region 106A and an active region 106D. Furthermore, as shown in FIG. 1, the STI structure 102 has a larger dimension, as compared to the STI structures 104, to accommodate a TSV structure 122. Although one TSV structure 122 is shown, the IC 10 may include more than one TSV structure 122 throughout, the number of TSV structures 122 in the IC 10 is not limited. In some embodiments, the STI structures 102 and STI structures 104 are formed of oxides such as silicon dioxide ($SiO_2$), nitrides, high-k dielectric material such as aluminum oxide (AlO), tantalum oxide (TaO), hafnium oxide (HfO), hafnium silicon oxide (HfSiO), hafnium aluminum oxide (HfAlO), or hafnium tantalum oxide (HfTaO), or the combination thereof, for example. The STI structure 102 and TSV structure 122 will be further described below.

The active region 106A and active region 106D may be doped regions on the semiconductor substrate 100 that are electrically isolated from each other by the STI structures 104. Although one active region 106A and one active region 106D are shown, the IC 10 may include multiple active regions 106A and multiple active regions 106D throughout, and the number of active regions in the IC 10 is not limited. The active region 106A and active region 106D may have a varied distribution of N-type dopant and P-type dopant that would become channel regions of semiconductor devices. In some embodiments, the active region 106A that is located further away from the STI structure 102 may correspond to a doped region of an active device, and the active region 106D that is located adjacent to the STI structure 102 corresponds to a doped region of a dummy device. Hereinafter, an active device may refer to device that may couple with other devices or external signals to perform electrical functions, and a dummy device may refer to device that is not electrically coupled to other devices.

A metal gate 108A is formed over the active region 106A and is connected to a metal pad 112A through a metal gate via 110A. The metal pad 112A may be further electrically connected to other active devices (not shown) through overlying metal vias 114 and metal interconnections 116. For active region 106D, a dummy metal gate 108D is formed thereover and the dummy metal gate 108D is connected to a dummy metal pad 112D through a dummy metal gate via 110D. The dummy metal pad 112D is not further connected to other metal lines. In other words, the active region 106A and metal gate 108A forms an active device that is to be electrically connected to other active devices or external environment, while the active region 106D and dummy metal gate 108D forms a dummy device that does not connect to other devices to perform electrical functions. The metal pad 112A, metal gate via 110A, metal vias 114, metal interconnections 116, dummy metal pad 112D and dummy metal gate via 110D are embedded in their respective dielectric layers 118.

Still referring to FIG. 1, the TSV 122 penetrates from the dielectric layer 118 through STI structure 102 to the back side of the semiconductor substrate 100. A metal pad 112V being substantially level with the metal pad 112A and the dummy metal pad 112D may be formed over the top end of the TSV 122, and another metal pad 124V may be formed over the bottom end of the TSV 122. The TSV 122 is provided to connect electrical signals to the back side of the semiconductor substrate 100. Depending on the desired dimension of TSV 122, the dimension of STI structure 102 may be changed accordingly. The STI structure 102 may also have a thickness that is different from the STI structure 104. In some embodiment, the TSV 122 may have a diameter D1 of between 0.3 µm to about 12 µm. In some embodiment, the STI structure 102 may have a lateral dimension of about 1 to about 2 times the diameter D1 of the TSV 122. In some embodiments, lateral dimension of the metal pad 124V on the bottom end of the TSV 122 may be larger than the metal pad 112V on the top end of the TSV 122.

Due to the much larger size of the TSV 122 in comparison to the devices formed on the semiconductor substrate 100 of the IC 10, the TSV 122 may impact the overall performance of the IC 10. Particularly, performance of devices in the vicinity of the TSV 122 may suffer due to the stress induced by the TSV 122. This stress may arise from fabrication process of the TSV 122 or due to mismatch in coefficient of thermal expansion (CTE) between TSV 122 and semiconductor substrate 100 when the IC 10 undergoes a temperature change, such as heating and cooling down during thermal processes. To reduce the impact of stress on the performance of IC 10, a keep-out-zone (KOZ) around the TSV 122 is imposed, and active devices are restricted from being placed within the KOZ.

The KOZ restriction surrounding the TSV 122 may result in the TSV 122 being spaced apart from the nearest active device (i.e. nearest active region 106A) by a spacing S1. In some embodiments, the spacing S1 is between about 0.08 µm to about 1000 µm. In some embodiments, the spacing S1 is between about 0.08 µm to about 100 µm.

To reduce non-uniform loading effects, particularly on the active regions 106A of active devices, dummy devices (i.e. active regions 106D) are disposed within the KOZ. The dummy devices in the KOZ increases the overall uniformity of distribution of devices in the IC 10, resulting in uniform loading effects for the active regions 106A. Although dummy devices are disposed in the KOZ, an excluded zone within the KOZ excludes any devices (i.e. active or dummy devices). The excluded zone is defined as the area between the TSV 122 and the boundary of STI structure 102. In some embodiment, the distance dl between TSV 122 and the boundary of STI structure 102 is between about 0.01 µm to about 500 µm. In some embodiment, the distance dl between TSV 122 and the boundary of STI structure 102 is between about 0.01 µm to about 10 µm.

In some embodiments, the excluded zone is defined as the area between the nearest active region of the dummy device (i.e., the active region 106D) and the TSV 122. In some embodiment, the nearest active region 106D of the dummy device is separated from the TSV region by a distance dl of between about 0.01 µm to about 500 µm. In some embodiment, the nearest active region 106D of the dummy device is separated from the TSV region by a distance dl of between about 0.01 µm to about 10 µm.

Figure 2:
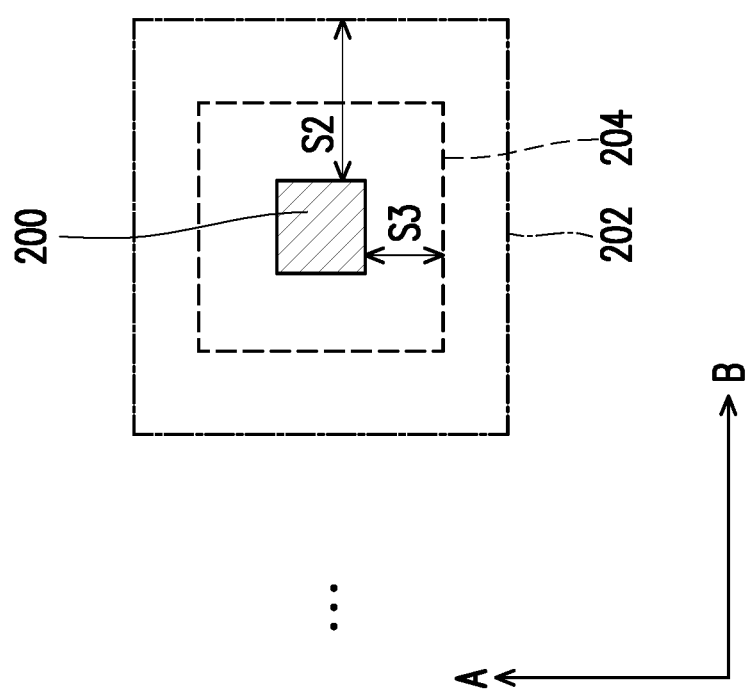
FIGS. 2-5 illustrate various steps of generating an IC layout design in accordance with some embodiments.

FIGS. 2-5 illustrate various steps of generating an IC layout design 20 having patterns of TSV region 200 in accordance with some embodiments. In some embodiments, the IC layout design 20 may be one of the IC layout design used to manufacture the IC 10 described in FIG. 1. A coordinate system having mutually orthogonal A and B axes are provided for ease of description. Referring to FIG. 2, patterns of the TSV region 200 are generated in IC layout design 20. The number and positions of the TSV region 200 may be decided based on design rules and requirement of the IC to be manufactured. As described above with reference to FIG. 1, a TSV structure in an IC should be provided within the boundaries of an STI structure, the boundary defining a region where no device should be disposed. The TSV structure should also be further surrounded by a KOZ region wherein only dummy devices may be placed. Returning to FIG. 2, by deciding the position and size of the TSV region 200, a first boundary 202 and a second boundary 204 are determined.

The area enclosed by the first boundary 202 is the KOZ and the area enclosed by the second boundary 204 is the excluded region. The area enclosed by the first boundary 202 and the second boundary 204 may be referred to as a first layout region, wherein layout patterns of dummy devices may be generated, as will be described below. In other words, the excluded region and the first layout region are different parts of the KOZ. The area outside of the first boundary 202 may be referred to as a second layout region, wherein layout patterns of active devices and/or dummy devices may be generated, as will be described below.

Although the TSV region 200 is shown as being symmetrically placed (i.e. centered) within the boundary 202 and boundary 204, the TSV region 200 may also offset in the A-direction, B-direction or a combination of A-direction and B-direction with respect to the center of the boundary 202 or boundary 204. In some embodiment, the edge of the TSV region 200 may be spaced apart from the boundary 202 by a spacing S2 of between about 0.1 µm to about 1000 µm, or between about 0.1 µm to about 100 µm. In some embodiment, the edge of the TSV region 200 may be spaced apart from the boundary 204 by a spacing S3 of between about 0.1 µm to about 500 µm, or between about 0.01 µm to about 10 µm.

Figure 3:
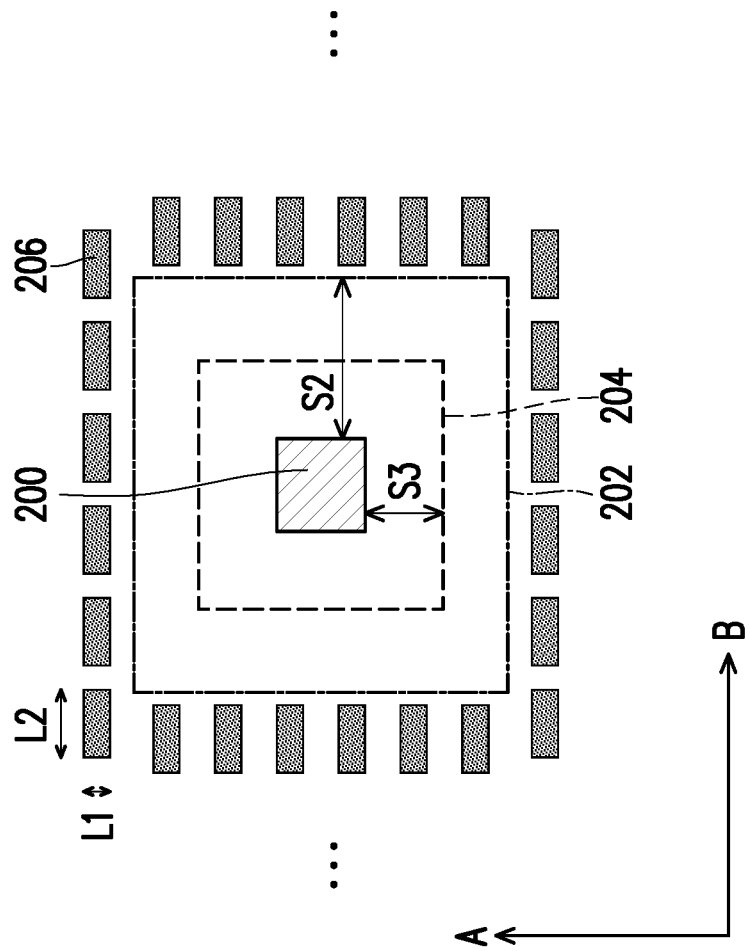

In FIG. 3, a pattern of active regions 206 corresponding to active devices is generated outside of the boundary 202 (i.e. the second layout region). The size and distribution of active regions 206 may be determined by the design rules of the IC to be manufactured. The active regions 206 may be arranged in an array that surrounds the TSV regions 200, and each of the active regions 206 may be spaced from other active regions 206. In some embodiments, when a TSV region 200 is located at the edge of the IC layout design, the active regions 206 may not be disposed on the side of the TSV region 200 that is nearer to the edge of the IC layout design. In other words, the active regions 206 may not always surround all of the TSV region 200. In some embodiments, the active regions 206 may correspond to regions that are defined by STI structures (i.e. oxide defined regions), and therefore the spacing between active regions 206 may be regarded as STI regions.

In some embodiments, each of the active regions 206 may correspond to one active device. In some embodiments, each of the active regions 206 may correspond to a group of active devices. In some embodiments, each of the active regions 206 correspond to doped regions on semiconductor substrate that may be channel region of one or more active devices. In some embodiments, each of the active regions 206 may include a group of stripes that extends along the B-direction which may correspond to a group of fins of fin field-effect transistor (FinFET) structures.

In some embodiments, the active regions 206 may have a rectangular shape elongated in the same direction (e.g. B-direction). Each of the active regions 206 may have a length L1 in the A-direction and a length of L2 in the B-direction. In FIG. 3, each of the active regions 206 have substantially identical length L1 and length L2. In some embodiments, at least two of the active regions 206 may have different length L1 or different length L2. In some embodiments, the length L1 may be between about 0.001 µm to about 100 µm, and the length L2 may be between about 0.05 µm to about 500 µm.

Figure 4:
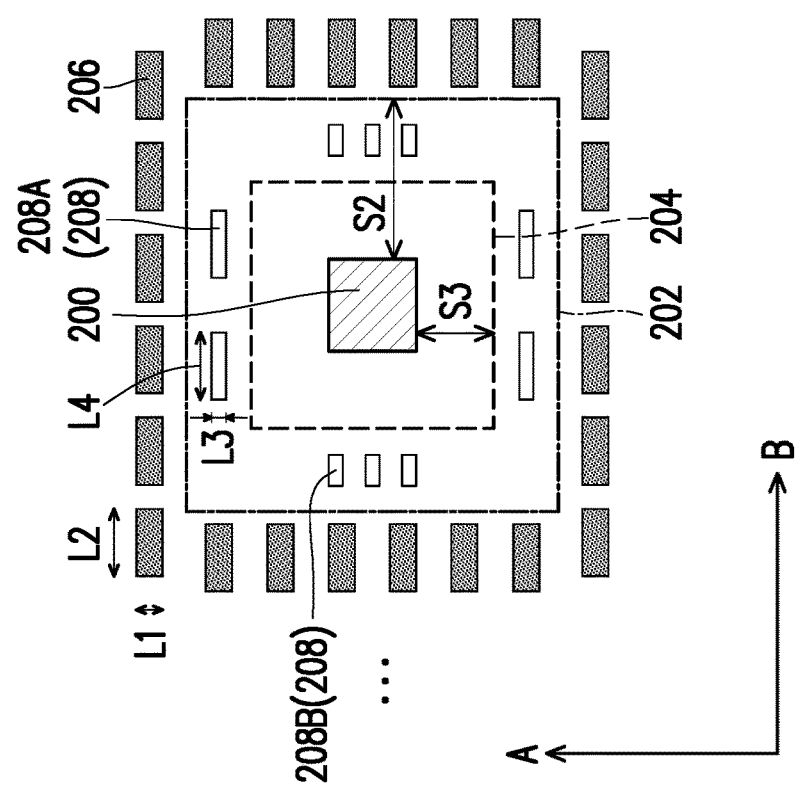

In FIG. 4, a pattern of dummy active regions 208 corresponding to dummy devices are generated within the area enclosed by the first boundary 202 and the second boundary 204 (i.e. the first layout region). The dummy active regions 208 may be arranged in an array, and each of the dummy active regions 208 may be spaced from other dummy active regions 208. In some embodiments, when a TSV region 200 is located at the edge of the IC layout design, the active regions 208 may not be disposed on the side of the TSV region 200 that is nearer to the edge of the IC layout design. In other words, the active regions 208 may not surround all of the TSV regions 200.

In some embodiments, the dummy active regions 208 may correspond to regions that are defined by STI structures (i.e. dummy oxide defined regions), and therefore, similar to the active regions 206, the spacing between dummy active regions 208 may also be regarded as STI regions. In other words, positions of the IC layout design on which no pattern of TSV region 200, active regions 206 and dummy active regions 208 are generated may be regarded as the STI region.

In some embodiments, each of the dummy active regions 208 may correspond to one dummy device. In some embodiments, each of the dummy active regions 208 may correspond to a group of dummy devices. In some embodiments, each of the dummy active regions 208 correspond to doped regions on semiconductor substrate that may be channel region of one or more dummy devices. In some embodiments, each of the dummy active regions 208 may correspond to a group of fins used in manufacturing dummy FinFET structures.

In some embodiments, the dummy active regions 208 may have a rectangular shape. Each of the dummy active regions 208 may have a length L3 in the A-direction and a length L4 in the B-direction. Each of the dummy active regions 208 may have substantially identical length L3 and at least two of the dummy active regions 208 may have different length L4. For example, the dummy active regions 208A and 208B may have different length L4. In some embodiments, the dummy active regions 208 may have substantially identical length L4. Further, as shown in FIG. 4, the dummy active regions 208 have lengths L3 that is shorter than length L1 of the active regions 206. In some embodiments, the length L3 may be between about 0.001 µm to about 100 µm, and the length L4 may be between about 0.05 µm to about 500 µm.

By providing all the dummy active regions 208 within the first layout region (i.e. KOZ) with substantially identical dimension in the A-direction, the uniformity in the KOZ increased, resulting in a reduction in non-uniform loading effect on the active devices during the manufacturing process of the IC. As a result, the performance of the active devices may be improved. In some embodiments, the saturation current of the active devices having dummy devices in the KOZ with dummy active regions having substantially identical dimension in the A-direction may increase by about 3% to about 20%, and threshold voltage value of the active devices having dummy devices in the KOZ with dummy active regions having substantially identical dimension in the A-direction may decrease by about 3% to about 20%, when compared to active devices in IC that has dummy devices with dummy active regions that has different dimensions in the A-direction and B-direction. In other words, by providing dummy active regions 208 in the first layout region with substantially identical dimension in the A-direction, the speed of active devices improves.

Figure 5:
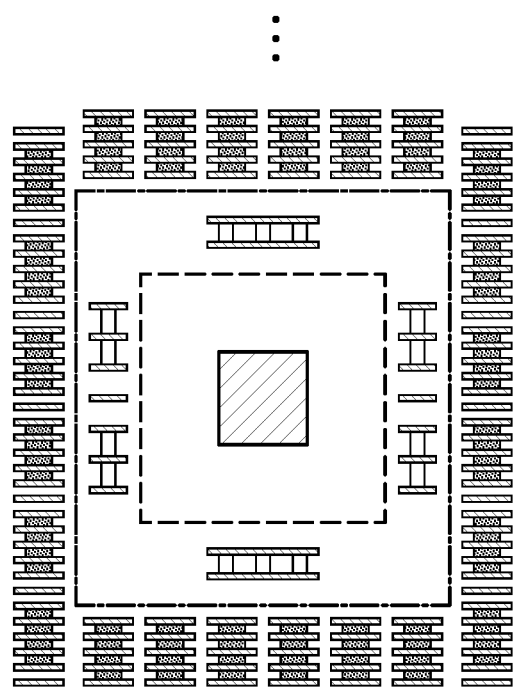
Figure 5:
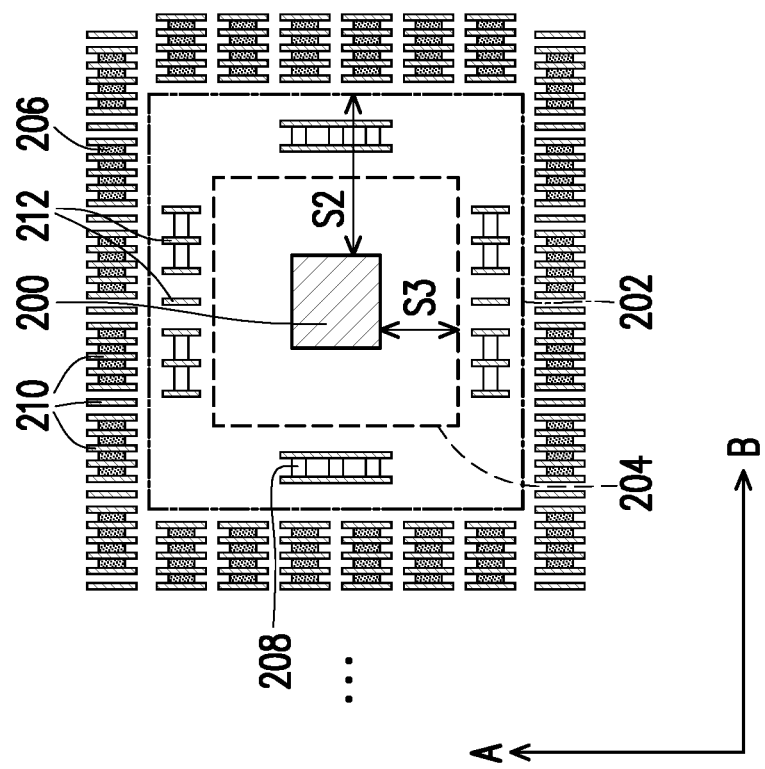

Next, referring to FIG. 5, patterns of gate structures are generated over the active regions 206, the dummy active regions 208 and the STI region. In detail, gate patterns 212 are generated over the dummy active regions 208 and STI region in the first layout region, and gate patterns 210 are generated over the active regions 206 and the STI region in the second layout region. The gate patterns 210 that are positioned on the edges of the active regions 206 and on the STI region between two active regions 206 may correspond to dummy metal gates. The gate patterns 210 that extend over an active region 206 between two edges of the active region 206 may correspond to active metal gates (e.g. metal gate 108A of FIG. 1). On the other hand, all of the gate patterns 212 that are positioned in the first layout region correspond to dummy metal gates. In some embodiment, the gate patterns 210 and gate patterns 212 may correspond to patterns of polysilicon gates.

In some embodiments, the gate patterns 210 are generated with the corresponding active regions 206 during the generation of patterns of active regions 206 described above with reference to FIG. 3, and the gate patterns 212 are generated with the corresponding dummy active regions 208 during the generation of patterns of dummy active regions 208 described above with reference to FIG. 4. In other words, the gate patterns 210 are generated before generating pattern of the dummy active regions 208.

Still referring to FIG. 5, each of the gate patterns 210 may have substantially identical dimension along the A-direction and substantially identical dimension along the B-direction.

In some embodiments, at least two of the gate patterns 210 may have different dimensions along the A-direction and/or the B-direction. For gate patterns 212, the dimension along the B-direction is substantially identical for each gate pattern 212, but the dimension along the A-direction may be different. In some embodiments, at least two of the gate patterns 212 may have different dimension along the B-direction.

A fill rate of the IC layout design 20 is related to the area occupied by the active regions 206 and the dummy active regions 208. In some embodiments, the fill rate is referred to as a density of the active regions 206, 208 throughout the layout area other than the excluded regions. The fill rate may be defined as "L1×L2×n1+L3×L4×n2" divided by "$A_{total}$−$A_{204}$×n3", wherein L1 is the length L1 (shown in FIG. 4) of one active region 206 in the A-direction, L2 is the length L2 (shown in FIG. 4) of one active region 206 in the B direction, n1 is the number of the active regions 206, L3 is the length L3 (shown in FIG. 4) of one dummy active region 208 in the A-direction, L4 is the length L4 (shown in FIG. 4) of one dummy active region 208 in the B direction, n2 is the number of the dummy active regions 208, $A_{total}$ is a total area occupied by the IC layout design 20, $A_{204}$ is an area enclosed by one boundary 204, and n3 is the number of the areas enclosed by the boundaries 204 (i.e., the number of the excluded regions). In some embodiments, $A_{total}$ (i.e., the total area occupied by the IC layout design 20) may be referred to as an area of a wafer or a chip. In some embodiments, the fill rate of the IC layout design 20 may range between about 30% and about 60%. In some embodiments, the density of the dummy active regions 208 and gate patterns 212 may be about 80% to about 100% the density of the active regions 206 and the gate patterns 206.

Figure 6:
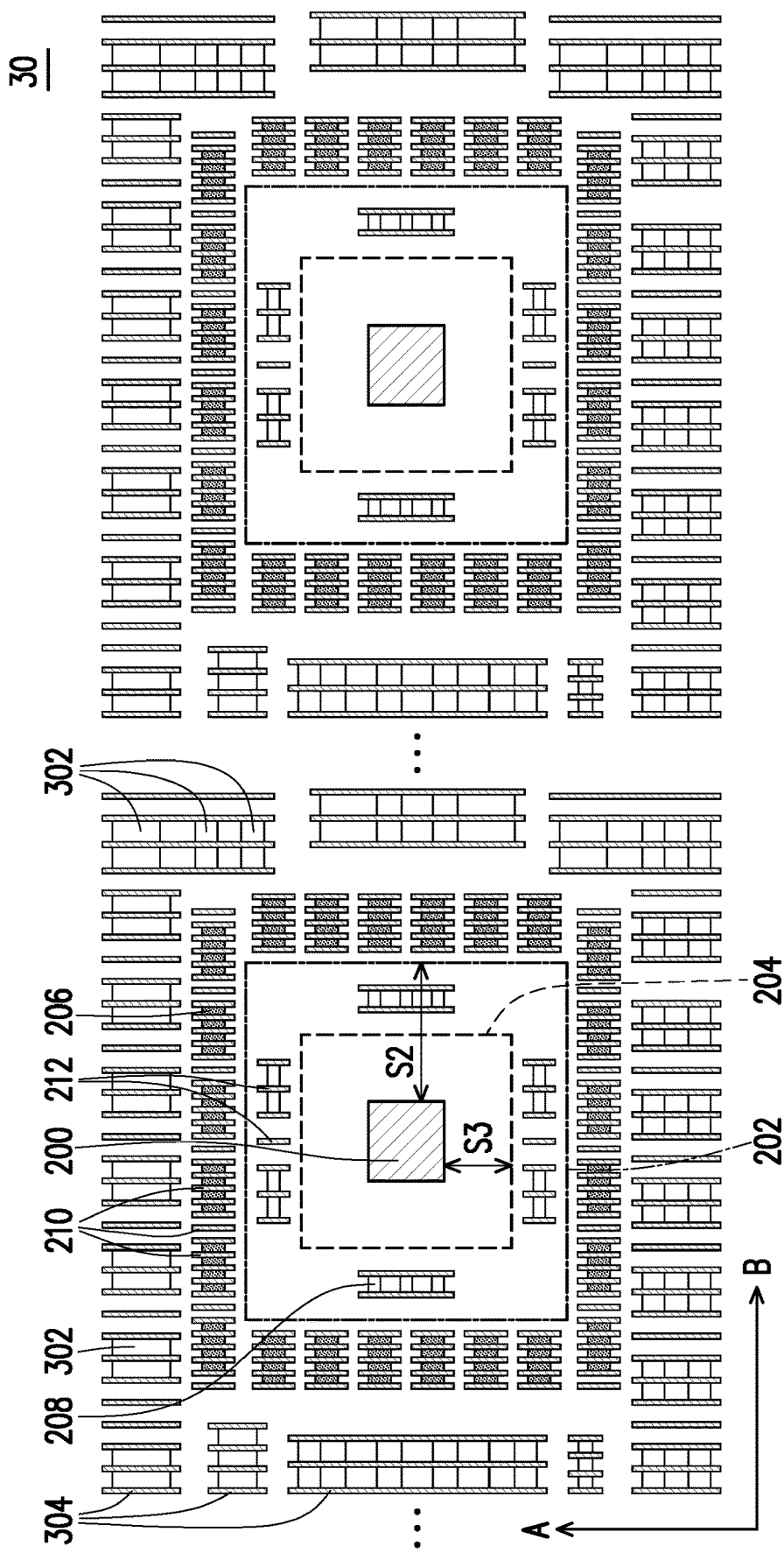
FIGS. 6-8 illustrate various alternative IC layout designs in accordance with alternative embodiments.
Figure 7:
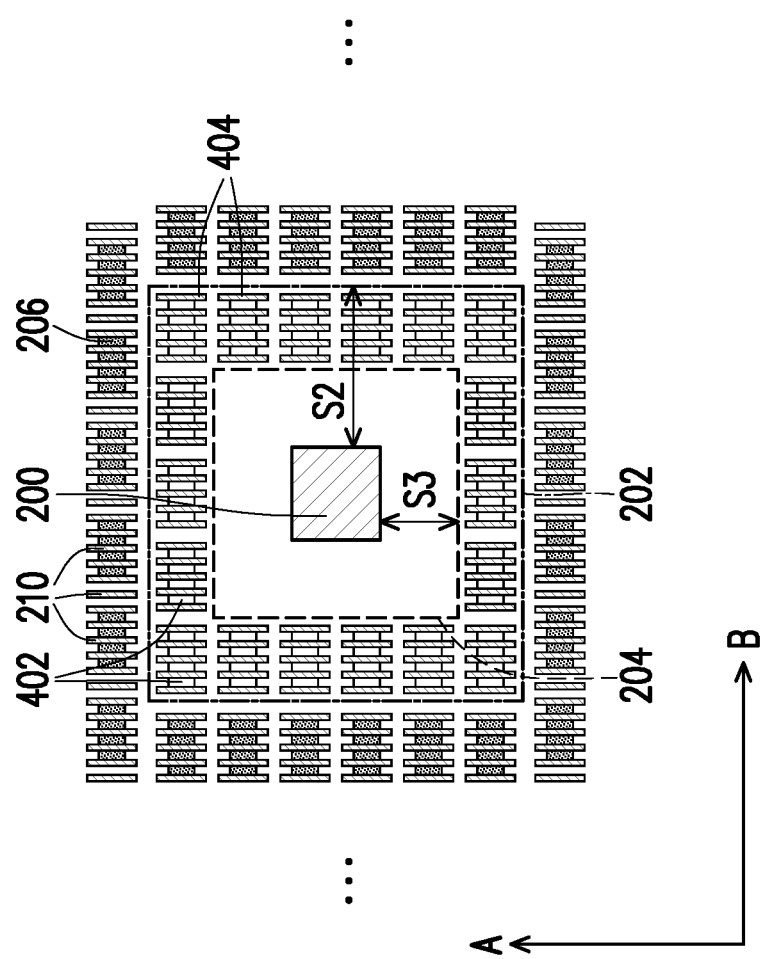
Figure 8:
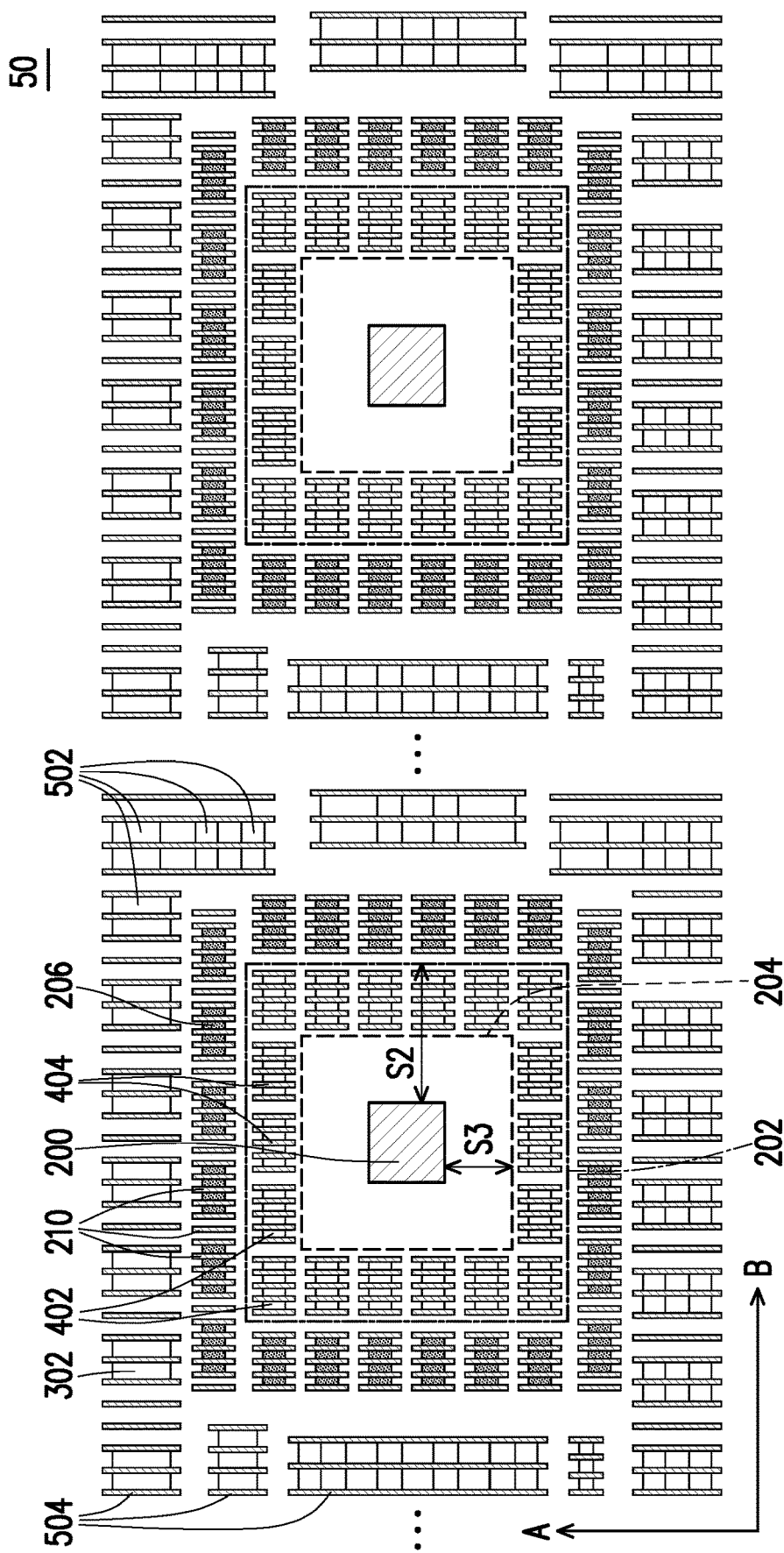

FIGS. 6-8 illustrate various alternative IC layout designs 30, 40, 50, in accordance with alternative embodiments. In FIG. 6, IC layout design 30 is similar to IC layout design 20 of FIG. 5 except that patterns of dummy active regions 302 and gate patterns 304 are further generated on the second layout region. The dummy active regions 302 and gate patterns 304 may correspond to dummy devices that are outside of the KOZ of an IC.

In some embodiments, the pattern of the dummy active regions 302 are generated after the generation of gate patterns 210 and gate patterns 212 discussed above with reference to FIG. 5. In some embodiments, the pattern of the dummy active regions 302 are generated together with generation of the dummy active regions 208 discussed above with reference to FIG. 4. In some embodiments, the pattern of the dummy active regions 302 are generated before gate patterns 210 and gate patterns 212 are generated, and the gate patterns 304 are generated together with gate patterns 210 and gate patterns 212.

The dummy active regions 302 and gate patterns 304 may fill the void surrounding the active region 206. By filling voids surrounding active regions 206 with dummy active regions 302, non-uniform loading effects on the active devices corresponding to active regions 206 during manufacturing processes may be reduced. As a result, performance loss of active devices may be prevented.

Each of the dummy active regions 302 may be provided with a dimension in the A-direction and in the B-direction that is different from each other. The determination of the dimension of the dummy active regions 302 may depend on the voids surrounding the active region 206. For example, the dummy active regions 302 may follow the shapes and sizes of the voids surrounding the active region 206. In some embodiments, the dimension of the dummy active regions 302 is determined by the fill rate requirement of the voids surrounding the active region 206. Similarly, the gate patterns 304 may have different dimension according to the dimension of the dummy active regions 302.

In FIG. 7, IC layout design 40 is similar to IC layout design 20 of FIG. 5 except that patterns of dummy active regions 402 and gate patterns 404 that are generated on the first layout region are substantially identical to the active regions 206 and gate pattern 208 generated on the second layout region. That is, each of the active regions 206 and dummy active regions 402 have substantially identical lengths along the A-direction and the B-direction. Similarly, the gate patterns 210 and the gate patterns 404 have substantially identical lengths along the A-direction and the B-direction. Since all the active regions (i.e. 206 and 402) are substantially identical in shapes and sizes, the overall uniformity is increased, thus reducing non-uniform loading effect on the active devices during the manufacturing process of the IC. As a result, the performance of the active devices may be improved.

In some embodiments, the saturation current of the active devices having dummy devices with substantially identical dimension in the KOZ may increase by about 3% to about 5%, and threshold voltage value of the active devices having dummy devices with substantially identical dimension in the KOZ may decrease by about 3% to about 5%, when compared to active devices in IC that has dummy devices with dummy active regions that has different dimensions in the A-direction and B-direction. In other words, by providing the dummy active regions 402 in the first layout region with substantially identical dimension to the active regions 206, the speed of active devices improves.

In FIG. 8, IC layout design 50 is similar to IC layout design 40 of FIG. 7 except that patterns of dummy active regions 502 and gate patterns 504 are further generated on the second layout region. The dummy active regions 502 and gate patterns 504 may correspond to dummy devices that are outside of KOZ of an IC. The dummy active regions 502 and gate patterns 504 may be similar to the dummy active regions 302 and gate patterns 304 described with reference to FIG. 6 above, details of which will not be repeated herein.

In some embodiments, the IC layout design 20, IC layout design 30, IC layout design 40 and IC layout design 50 are generated by a general-purpose computing device including a hardware processor, non-transitory computer readable storage medium, I/O interface and network interface being connected together via bus. In some embodiments, the processor is a central processing unit (CPU), a multi-processor, a distributed processing system, an application specific integrated circuit (ASIC), and/or a suitable processing unit. In some embodiments, the non-transitory computer readable storage medium is a semiconductor or solid-state memory, a magnetic tape, a removable computer diskette, a random access memory (RAM), a read-only memory (ROM), a rigid magnetic disk, and/or an optical disk. The IC layout designs may be generated by the processor using a tool such as VIRTUOSO® available from CADENCE DESIGN SYSTEMS, Inc., or another suitable layout generating tool stored in the non-transitory computer readable storage medium.

In some embodiment, the I/O interface includes a keyboard, keypad, mouse, trackball, trackpad, touchscreen, and/or cursor direction keys for communicating information and commands to the processor. In some embodiment, the network interface includes wireless network interfaces such as BLUETOOTH, WIFI, WIMAX, GPRS, WCDMA, or the like; or wired network interfaces such as ETHERNET, USB, or the like. The general-purpose computing device may receive a command to generate an IC layout design through the I/O interface or the network interface.

In the above-mentioned embodiments, various embodiments of an IC layout design having TSV region are provided. The TSV region may impose a keep-out-zone (KOZ) wherein only groups of dummy active regions and corresponding gate patterns are provided. Outside of the KOZ, active regions are provided. To improve the uniformity of dummy active regions in the KOZ, at least the dimension of each of the group of dummy active regions along the length of the gate patterns are provided to be substantially identical. Active devices in ICs manufactured based on the IC layout design with improved uniformity of dummy active regions in KOZ may have improved speed and reduced leakage current.

In accordance with some embodiments of the present disclosure, a method including generation of IC layout design and manufacturing of an IC using the generated IC layout is provided. Generating the IC layout design includes: generating a pattern of a first isolation region; generating a pattern of a through-substrate via (TSV) region within the first isolation region; generating a pattern of a second isolation region surrounding the first isolation region, wherein the second isolation region includes an inner layout region and an outer layout region, and the outer layout region is separated from the first isolation region by the inner layout region; generating a pattern of first channel regions of dummy transistors, wherein the pattern of first channel regions are within the inner layout region; generating a pattern of second channel regions of active transistors, wherein the pattern of second channel regions are within the outer layout region; generating a pattern of first gates of the dummy transistors in the inner layout region, wherein the first gates overlap with the first channel regions, and the first channel regions are substantially identical in channel width; and generating a pattern of second gates of the active transistors in the outer layout region, wherein the second gates overlap with the second channel regions. In some embodiments, the channel width of the first channel regions is smaller than a channel width of at least one of the second channel regions. In some embodiments, the channel width of the first channel regions is substantially identical to a channel width of the second channel regions. In some embodiments, the outer layout region and the TSV region are spaced apart by a distance ranging from about 0.8 μm to about 100 μm. In some embodiments, the channel width of the first channel regions is between about 0.09 μm to about 0.5 μm. In some embodiments, a fill rate of the IC layout design is between about 30% to about 60%. In some embodiments, at least two of the first channel regions are different in channel length. In some embodiments, the first channel regions are substantially identical in channel length.

In accordance with alternative embodiments of the present disclosure, a method including generation of IC layout design and manufacturing of an IC using the generated IC layout is provided. Generating the IC layout design includes: generating a pattern of a through-substrate via (TSV) region; generating a pattern of first channel regions of first transistors around the pattern of the TSV region, wherein the first transistors are separated from the TSV region by a keep-out-zone (KOZ); generating a pattern of second channel regions of second transistors in the KOZ; defining a separation region located between the TSV region, the first channel regions of first transistors and the second channel regions of second transistors as an isolation region, wherein the second channel regions of the second transistors are substantially identical in channel width. In some embodiments, generating the IC layout design further includes: generating gate patterns over the isolation region, the first channel regions of the first transistors and the second channel regions of the second transistors. In some embodiments, the pattern of second channel regions of second transistors is separated from the TSV region by an excluded region of the isolation region. In some embodiments, the TSV region is spaced apart from the nearest first transistor by a distance ranging from about 0.8 μm to about 100 μm. In some embodiments, the channel width of the second channel regions is smaller than a channel width of the first channel regions. In some embodiments, shapes and sizes of the second channel regions are substantially identical to shapes and sizes of the first channel regions. In some embodiments, at least two of the second channel regions are different in channel length.

In accordance with yet another alternative embodiment of the present disclosure, a method including generation of IC layout design and manufacturing of an IC using the generated IC layout is provided. Generating the IC layout design includes: generating a pattern of an isolation region to define a pattern of a through-substrate via (TSV) region, wherein a pattern of first channel regions in a first dummy device region surrounding the TSV region, a pattern of second channel regions in a second dummy device region surrounding the first dummy device region, and a pattern of third channel regions in an active device region located between the first dummy device region and the second dummy device region, wherein the first channel regions in the first dummy device region are substantially identical in channel width; and generating gate patterns over the isolation region, the first channel regions in the first dummy device region, the second channel regions in the second dummy device region, and the third channel regions in the active device region. In some embodiments, at least two of the second channel regions in the second dummy device region are different in channel width. In some embodiments, a channel width of the first channel regions of the first dummy device region is different from a channel width of one of the third channel regions of the second dummy device region. In some embodiments, a channel width of the first channel regions of the first dummy device region is substantially identical to a channel width of the third channel regions of the active device region. In some embodiments, the TSV region is spaced apart from the nearest first channel region of the first dummy device region by a distance ranging from about 0.01 μm to about 500 μm.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   generating an integrated circuit (IC) layout design, comprising:
   generating a pattern of a through-substrate via (TSV) region in a keep-out-zone (KOZ);

generating a pattern of first channel regions of first transistors in a layout region surrounding the KOZ;

generating a pattern of second channel regions of second transistors in the KOZ, wherein the first channel regions of the first transistors and the second channel regions of the second transistors are spaced apart from the TSV region, and the second channel regions of the second transistors are substantially identical in channel width; and manufacturing an IC based on the IC layout design.

2. The method according to claim 1, wherein generating the IC layout design further comprises:

generating gate patterns over the first channel regions of the first transistors and the second channel regions of the second transistors.

3. The method according to claim 1, wherein the TSV region is spaced apart from a nearest second channel region of the second transistors by a distance ranging from about 0.01 µm to about 500 µm.

4. The method according to claim 1, wherein the TSV region is spaced apart from a nearest first channel region of the first transistors by a distance ranging from about 0.8 µm to about 100 µm.

5. The method according to claim 1, wherein a channel width of the second channel regions is smaller than a channel width of the first channel regions.

6. The method according to claim 1, wherein shapes and sizes of the second channel regions are substantially identical to shapes and sizes of the first channel regions.

7. The method according to claim 1, wherein at least two of the second channel regions are different in channel length.

8. The method according to claim 1, wherein the first transistors are spaced apart from the TSV region by the KOZ.

9. A method, comprising:

generating an integrated circuit (IC) layout design, comprising:

generating a pattern of a through-substrate via (TSV) region;

generating a pattern of first channel regions of first transistors around the pattern of the TSV region, wherein the first transistors are separated from the TSV region by a keep-out-zone (KOZ);

generating a pattern of second channel regions of second transistors in the KOZ;

defining a separation region located between the TSV region, the first channel regions of the first transistors and the second channel regions of the second transistors as an isolation region;

wherein the second channel regions of the second transistors are substantially identical in channel width, and manufacturing an IC based on the IC layout design.

10. The method according to claim 9, wherein generating the IC layout design further comprises:

generating gate patterns over the isolation region, the first channel regions of the first transistors and the second channel regions of the second transistors.

11. The method according to claim 9, wherein the pattern of second channel regions of the second transistors is separated from the TSV region by an excluded region of the isolation region.

12. The method according to claim 9, wherein the TSV region is spaced apart from the nearest first transistor by a distance ranging from about 0.8 µm to about 100 µm.

13. The method according to claim 9, wherein a channel width of the second channel regions is smaller than a channel width of the first channel regions.

14. The method according to claim 9, wherein shapes and sizes of the second channel regions are substantially identical to shapes and sizes of the first channel regions.

15. The method according to claim 9, wherein at least two of the second channel regions are different in channel length.

16. A method, comprising:

generating an integrated circuit (IC) layout design, comprising:

generating a pattern of a through-substrate via (TSV) region in a keep-out-zone (KOZ);

generating a pattern of active channel regions of active transistors in a layout region surrounding the KOZ;

generating a pattern of dummy channel regions of dummy transistors in the KOZ, wherein the pattern of dummy channel regions of the dummy transistors is separated from the TSV region by an excluded region of the isolation region, and the second channel regions of the second transistors are substantially identical in channel width; and manufacturing an IC based on the IC layout design.

17. The method according to claim 16, wherein generating the IC layout design further comprises:

generating gate patterns over the active channel regions of the active transistors and the dummy channel regions of the dummy transistors.

18. The method according to claim 16, wherein a channel width of the dummy channel regions is smaller than a channel width of the active channel regions.

19. The method according to claim 16, wherein shapes and sizes of the dummy channel regions are substantially identical to shapes and sizes of the active channel regions.

20. The method according to claim 16, wherein at least two of the dummy channel regions are different in channel length.

* * * * *